May 21, 1940.    C. E. KRAUS    2,201,670
POWER TRANSMISSION MECHANISM
Filed Nov. 17, 1937
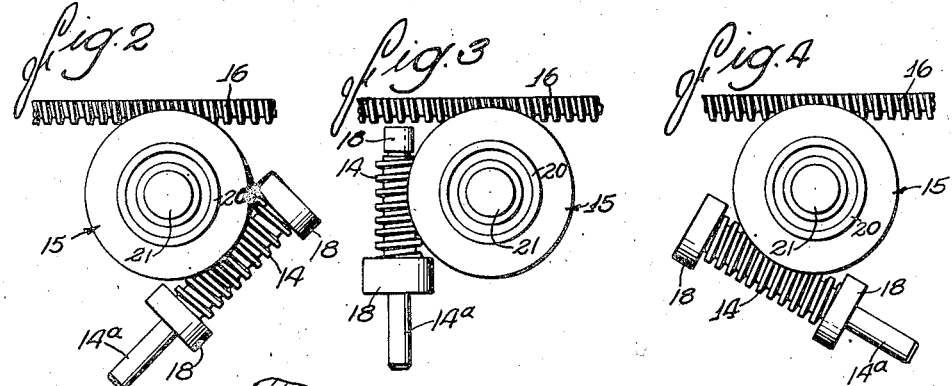
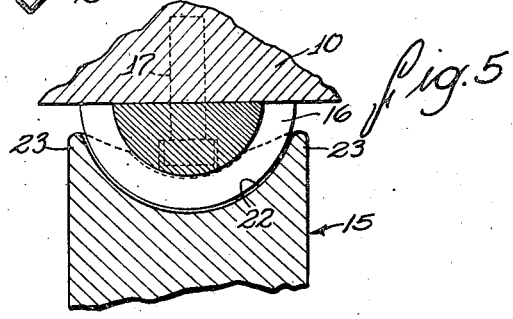
INVENTOR
Charles E. Kraus
ATTORNEYS Patented May 21, 1940

2,201,670

UNITED STATES PATENT OFFICE 2,201,670

POWER TRANSMISSION MECHANISM

Charles E. Kraus, Rockford, Ill., assignor to The Ingersoll Milling Machine Company, Rockford, Ill., a corporation of Illinois Application November 17, 1937, Serial No. 174,998

3 Claims. (Cl. 74—422)

The invention relates to a power transmission mechanism and more particularly to such a mechanism which is adapted for the conversion of rotary motion into rectilinear motion.

The general object of the present invention is to provide an improved form of power transmission mechanism for converting rotary into rectilinear motion which requires a minimum number of parts and in which the various elements can be cheaply formed by simple, well known machining operations.

A further object of the invention is to provide a power transmission mechanism of the type set forth in which the meshing toothed parts move with a smooth even action contacting each other over relatively large surface areas and which, in addition, permits of a high degree of flexibility in the relative positioning of the various elements.

A more specific object of the invention is to provide an improved form of power transmission mechanism embodying a worm driven worm wheel meshing with a rack comprising an elongated segment of a worm.

The invention also resides in the novel construction of the parts which facilitates lubrication.

Further objects and advantages of the invention will become apparent from the following description taken in connection with the accompanying drawing, in which Figure 1 is a perspective view of a drive mechanism embodying the present invention.

Figs. 2, 3, and 4 are diagrammatic views of the drive mechanism illustrating various relative arrangements of the elements.

Fig. 5 is an enlarged fragmentary sectional view along the line 5—5 in Fig. 1.

For convenience of illustration, the invention has been shown and described herein as embodied in a drive mechanism for a work table 10 of a machine tool. It will be understood, however, that the invention is capable of a wide variety of other applications and there is no intention to limit the invention to the particular illustrative embodiment. On the other hand, the appended claims are intended to cover all modifications and alternative constructions within the spirit and scope of the invention.

In the particular construction illustrated, the table 10 is mounted for endwise sliding movement in dove-tail ways 12 on a bed 11. Rotary power is derived from a suitable prime mover such, for example, as an electric motor (not shown) and applied to the table through the medium of the power transmission mechanism of the present invention. This mechanism, as illustrated, includes as its principal elements a driving worm 14 meshing with a worm wheel 15 which in turn meshes with an elongated worm 16 fast on the underside of the table 10. The latter worm 16 is shown as a half section or segment of an elongated worm or screw threaded member and constitutes, in effect, a rack meshing directly with the worm wheel 15.

The rack element 16 may be economically formed, for example, by cutting worm or other screw threads in a bar of round cross section by means of an ordinary thread mill or the like. The threaded member may then be split longitudinally, the two resulting portions or segments being arranged end-to-end to form a rack of the desired length. The flat upper surface of the member 16 permits ready attachment of the same to such an element as the table 10 as by means of bolts 17 (Fig. 5). The threads cut on the element 16 are preferably of the same shape and pitch diameter as those on the worm 14 and therefore mesh accurately with the teeth of the worm wheel. In addition, this tooth or thread arrangement provides a relatively large area of bearing engagement between the teeth of the worm wheel 15 and the teeth or threads on the element 16. Ordinarily, there are in excess of two threads or teeth on the rack element 16 in contact with the teeth of the worm wheel 15 at all times.

The worm 14 is of conventional construction and, as shown in Fig. 1, is fast on a horizontal shaft 14ª and journaled by antifriction bearings 18 supported in a hollow stationary housing 19 disposed below the table. The shaft 14ª projects from the housing and is rotated directly or through an intermediate mechanism from the prime mover. The housing also supports bearings 20 for a horizontal shaft 21 carrying the worm wheel 15.

Great flexibility in the relative positioning of the various elements of the drive mechanism is afforded. Thus, as shown in Figs. 2, 3, and 4, for example, the worm 14 may be located in a wide variety of positions about the periphery of the worm wheel 15.

In order to provide effective lubrication of the mating toothed surfaces of the element 16 and the worm wheel 15, the ends of the interdental spaces 22 are closed by end plates 23 integral with the worm wheel so as to form a series of pockets adapted to receive and contain lubricating fluid. As a result, lubricant supplied to the interior of the housing 19 is carried in these pockets upwardly to the element 16. If desired, a bath of lubricating oil may be maintained in the housing or as shown in Fig. 1, lubricant may be supplied through a conduit 24 which directs a stream of the oil into the interdental space pockets.

It will thus be seen that a very compact and highly effective drive mechanism has been provided and which may be accommodated readily to various relative positions of the driving and driven members. The number of parts required is minimized in that no intermediate pinions or the like are required. Furthermore, the driving worm 14 and rack or driven element 16 are formed in the same simple way thereby contributing to the low cost of the unit.

I claim as my invention:

1. The combination of a supporting member, a member slidable relative to said supporting member, an elongated rack secured to one of said members and having teeth thereon constituting elements of a worm thread, a mating worm wheel meshing with the teeth of said rack and mounted on the other of said members to turn about an axis extending transversely of the direction of movement of the slidable member, and a power rotated driving worm meshing with said worm wheel with the side thereof opposite said rack.

2. In a power transmission mechanism for converting rotary into rectilinear motion, the combination of a rotatable driving worm, a worm wheel meshing with said driving worm, and an elongated rack member having teeth thereon meshing with said worm wheel and constituting a segmental portion of a worm thread of substantially the same shape and pitch diameter as the thread on said driving worm.

3. In a power transmission mechanism, the combination of a power rotated driving worm, a rotatable worm wheel meshing with said driving worm, and an elongated screw held against rotation and meshing with said worm wheel, said screw and driving worm being mounted for relative rectilinear movement.

CHARLES E. KRAUS.